(No Model.)

C. S. MOTT.
FRICTION CLUTCH.

No. 565,016.  Patented Aug. 4, 1896.

WITNESSES:
M. B. Harris
C. Gerst

INVENTOR
Charles S. Mott,
BY Edgar Tate & Co
ATTORNEYS.

THE NORRIS PETERS CO., PHOTO-LITHO., WASHINGTON, D. C.

UNITED STATES PATENT OFFICE.

CHARLES SMITH MOTT, OF PATCHOGUE, NEW YORK.

FRICTION-CLUTCH.

SPECIFICATION forming part of Letters Patent No. 565,016, dated August 4, 1896.

Application filed September 18, 1895. Serial No. 562,838. (No model.)

*To all whom it may concern:*

Be it known that I, CHARLES SMITH MOTT, a citizen of the United States, and a resident of Patchogue, in the county of Suffolk and State of New York, have invented certain new and useful Improvements in Friction-Clutches, of which the following is a specification, reference being had to the accompanying drawings, forming a part thereof, in which similar letters of reference indicate corresponding parts.

This invention relates to friction-clutches which are used in connection with wheels or drums mounted on a shaft, and the object of which is to control the movement of the wheel or drum, the object of the invention being to provide a simple and effective device of this class which may be applied to machinery of any kind, and which is adapted for use in connection with machinery designed for any and all purposes where friction-clutches are employed.

The invention is fully disclosed in the following specification, of which the accompanying drawings form a part, in which—

Figure 1:
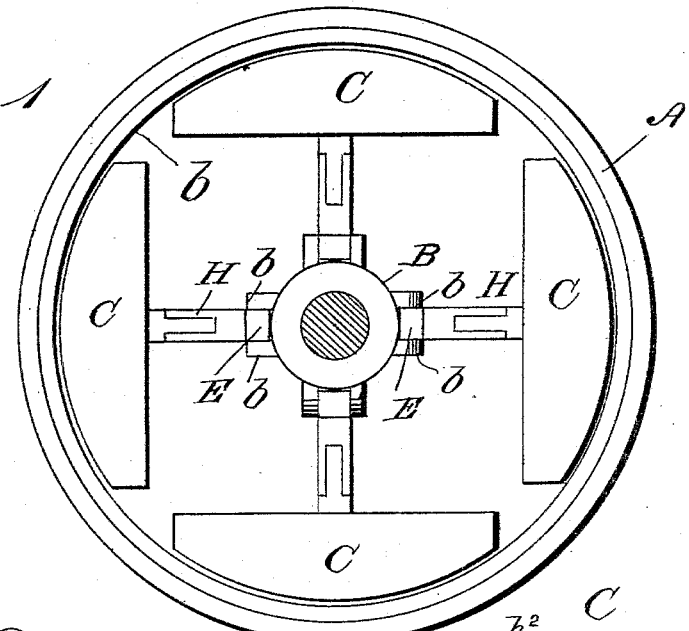
Figure 2:
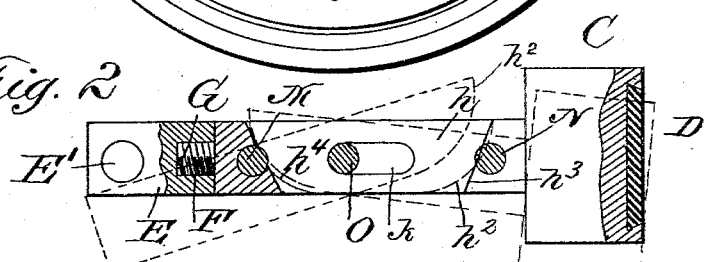
Figure 3:
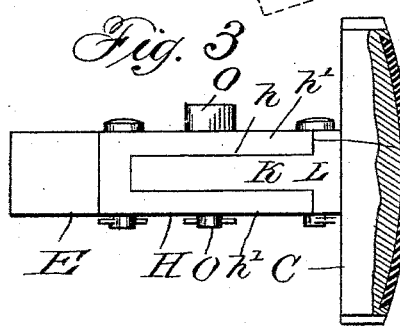
Figure 4:
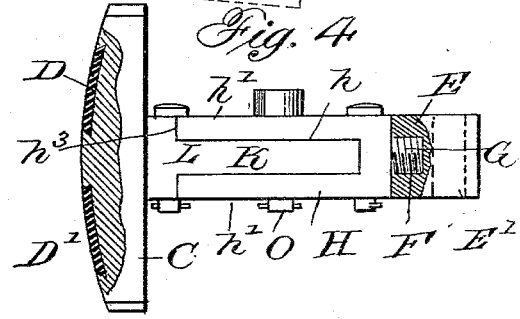

Figure 1 represents a plan view of a wheel or drum and a cross-section of a shaft provided with my improved clutch; Fig. 2, a side view of the clutch and the parts by means of which it is connected with the shaft, portions thereof being shown in section; Figs. 3 and 4, plan views of my improved clutch, showing modified forms of construction; and Figs. 5 and 6 are face views of the clutches shown in Figs. 3 and 4, respectively.

In the practice of my invention I provide a wheel or drum A, of any desired form or construction, having a rim or flange B, on the inner surface of which the shoes are adapted to operate, said wheel being mounted on a shaft in the usual manner, and adjacent thereto is arranged a sliding clutch-sleeve B, provided with a collar, which is not shown, and with which the shoes C are connected.

Figures 5, 6:
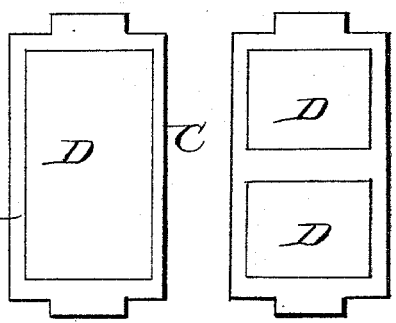

The shoes C are of the usual or any preferred form, and the bearing surface or face thereof is provided with rubber strips or plates D, which conform to the shape of the bearing-surface of the shoes, and which may consist of a single piece, as shown in Figs. 3 and 5, or of separate pieces, as shown in Figs. 4 and 6, and said pieces, when more than one are employed, may be arranged transversely or longitudinally of the shoes or the faces thereof.

Formed on opposite sides of the sleeve B are projections or shoulders $b$, between which is pivotally mounted the head E of the clutch-arm, the outer side of which is provided with a screw-threaded socket F, adapted to receive a screw-threaded shank G, formed on the end of the clutch-arm H, which is provided centrally with a longitudinal slot $h$, into which projects an extension K, formed on a shoulder or projection L, formed on or rigidly secured to the inner side of the shoes and centrally thereof in any desired manner.

The outer ends of the sides $h'$ of the clutch-arms are beveled on their inner surfaces or rounded, as shown in dotted lines at $h^2$ in Fig. 2, and adapted to abut against an inclined shoulder $h^3$, formed on the projection or shoulder L at the sides of the extension K, and the outer end of said extension K is also rounded and adapted to abut against the rounded inner end $h^4$ of the slot $h$, and passing through the clutch-arm at the rounded end of said slot is a roller M, on which the extension K is adapted to bear, and a corresponding roller N is also passed through the head of the clutch-arm and extends into the slot $h$, on which the beveled or rounded end of the extension K is adapted to bear.

Formed in the extension K is a longitudinal slot $k$, and passed therethrough and through the sides $h'$ of the clutch-arm $h$ is a pivotal bolt O, and, as will be understood, the clutch-arm or the sides $h'$ thereof and the extension K are pivotally connected by means of the bolt O, and said parts also have a slight longitudinal movement by reason of the slot $k$.

Instead of placing the rubber bearing surface or plates upon the faces of the shoes, I may provide the rubber bearing-surface on the inner side of the rim B of the drum A, or place such bearing-surface upon both the shoes and the drum, and other changes and alterations in the construction described may be made without departing from the spirit of my invention or sacrificing its advantages, and I therefore reserve the right to make all such modifications thereof as fairly come within the scope of the invention.

The friction-shoes C may be made of any desired material, and the heads E are connected with the sleeve B by means of bolts which pass through the jaws or projections b and bores or openings E', formed in said heads.

The operation will be readily understood from the foregoing description when taken in connection with the accompanying drawings. The sleeve B is operated in a manner well known to those familiar with this class of devices, and as said sleeve is moved inwardly toward the hub of the drum or wheel A the shoes are thrown outward and caused to engage the rim b of the drum, and as said sleeve is moved outwardly from said hub said shoes are released.

I have not shown the means for operating the sleeve B and other elements of construction which make up a complete and operative device of this character, my invention being limited to the friction-surfaces of the shoes or the modification thereof herein described, and also to the means of connecting the shoes with the sliding sleeve, and I may also substitute other or equivalent material for the rubber used as a bearing-surface, as herein described.

Having fully described my invention, I claim and desire to secure by Letters Patent—

1. The combination in a friction device, of a wheel and drum upon which is formed a flange or rim, friction-clutches having rubber or similar bearing-pieces, a sliding sleeve connected with one of said clutches, and provided with a shoulder and head mounted between said shoulders, a clutch-arm connected with said head, in which is formed a longitudinal slot and a shoe provided with a shoulder projection on which is formed an extension adapted to engage said slot, and connections between the same and said clutch-arm, substantially as described.

2. The combination in a friction-clutch, of the character described, of a wheel or drum carried by a shaft and a sliding sleeve also mounted on said shaft, upon which are formed projections or shoulders, a head pivotally mounted between said clutch and a clutch-arm connected with said head and in the outer end of which is formed a longitudinal slot, a shoe having a shoulder or projection on which is formed an extension adapted to engage said slot, and a bolt connecting said extension with said arm, substantially as and for the purpose set forth and described.

3. The combination of a wheel or drum, a shaft upon which said wheel or drum is mounted, a sliding sleeve also mounted on said shaft provided with projections or shoulders, between which is pivotally mounted a head, a clutch-arm connected therewith, which is provided at its outer end with a longitudinal slot, and a shoe provided with a shoulder or projection on which is formed an extension which is adapted to enter said slot, a bolt pivotally connecting said clutch-arm and said extension, the latter being provided with a longitudinal slot through which said bolt passes and the outer end of said extension being rounded, a roller upon which said extension is adapted to bear which passes through said clutch-arm on the inner end of said slot and the sides of the clutch-arm being rounded, a roller upon which the sides of the clutch-arm are adapted to bear which passes through the shoulder or projection formed on or secured to the shoe, substantially as shown and described.

In testimony that I claim the foregoing as my invention I have signed my name, in presence of the subscribing witnesses, this 13th day of September, 1895.

CHARLES SMITH MOTT.

Witnesses:
JAMES RICE KETCHAM,
ISAAC G. WILLETTS.